(12) United States Patent
Chuang

(10) Patent No.: US 12,502,042 B2
(45) Date of Patent: Dec. 23, 2025

(54) WATERLESS TOILET

(71) Applicant: Paul Chuang, Tainan (TW)

(72) Inventor: Paul Chuang, Tainan (TW)

( * ) Notice: Subject to any disclaimer, the term of this patent is extended or adjusted under 35 U.S.C. 154(b) by 65 days.

(21) Appl. No.: 18/596,574

(22) Filed: Mar. 5, 2024

(65) Prior Publication Data

US 2025/0281011 A1    Sep. 11, 2025

(51) Int. Cl.
*A47K 11/02* (2006.01)

(52) U.S. Cl.
CPC .................... *A47K 11/026* (2013.01)

(58) Field of Classification Search
CPC ....................................... A47K 11/026
USPC ............................. 4/449, 300, 661
See application file for complete search history.

(56) References Cited

U.S. PATENT DOCUMENTS

| | | | | |
|---|---|---|---|---|
| 4,025,969 A * | 5/1977 | Dahlen | ........... | A47K 11/026 4/484 |
| 4,346,002 A * | 8/1982 | Petzinger | ........... | C05F 3/04 4/111.1 |
| 4,519,104 A * | 5/1985 | Nilsson | ........... | A47K 11/026 4/484 |
| 6,052,842 A * | 4/2000 | He | ........... | A47K 11/026 4/484 |
| 6,813,786 B1 * | 11/2004 | Pier | ........... | A47K 11/06 4/484 |
| 8,006,324 B2 * | 8/2011 | Ophardt | ........... | E03D 9/00 4/300 |
| 8,266,739 B2 * | 9/2012 | Schaaf | ........... | C05F 3/04 4/449 |
| 8,364,546 B2 * | 1/2013 | Yenni | ........... | H04L 67/12 702/56 |
| 8,408,160 B1 * | 4/2013 | Pozin | ........... | A01K 1/011 53/567 |
| 9,149,163 B2 * | 10/2015 | Natt | ........... | A47K 11/02 |
| 9,357,890 B2 * | 6/2016 | Morris | ........... | A47K 11/026 |
| 9,364,124 B2 * | 6/2016 | Morris | ........... | A47K 11/026 |
| 9,974,520 B2 * | 5/2018 | Kramer | ........... | A61B 10/007 |
| 10,589,927 B2 * | 3/2020 | Schofield | ........... | B65B 51/16 |
| 10,743,728 B2 * | 8/2020 | Nelson | ........... | E04H 1/1216 |
| 11,020,302 B2 * | 6/2021 | Gradov | ........... | A61G 9/003 |
| D925,770 S * | 7/2021 | Nelson | ........... | E03D 11/00 D25/16 |
| 11,123,049 B2 * | 9/2021 | Kramer | ........... | E03D 11/00 |
| 11,206,959 B2 * | 12/2021 | Schaaf | ........... | A47K 11/02 |
| 11,241,125 B2 * | 2/2022 | Nelson | ........... | E04H 1/1216 |
| 11,317,898 B2 * | 5/2022 | Kramer | ........... | A61B 10/007 |

(Continued)

FOREIGN PATENT DOCUMENTS

| | | | | |
|---|---|---|---|---|
| CH | 710996 A1 | * | 10/2016 | ........... A47K 11/026 |
| CN | 110949784 A | * | 4/2020 | ........... B65B 61/06 |

(Continued)

*Primary Examiner* — Lori L Baker (74) *Attorney, Agent, or Firm* — LANWAY IPR SERVICES; Chun-Ming Shih (57) ABSTRACT

A waterless toilet comprises: a base, a first roller, a second roller, two support brackets, two support plates, two cloth rolls having a plastic sheet respectively, a driver, a seat cushion bracket, and a toilet seat; wherein the plastic sheets of the two cloth rolls are laid on the two support plates, thus excrement from the toilet seat is captured completely; thereby human waste is collected without using water and small of collected human waste is prevented, furthermore, consumable costs of plastic sheet are saved.

6 Claims, 10 Drawing Sheets

(56) References Cited

U.S. PATENT DOCUMENTS

| | | | | |
|---|---|---|---|---|
| 11,918,155 B2 * | 3/2024 | Welfare | ................ | A47K 13/307 |
| 11,974,703 B2 * | 5/2024 | Luettgen | ................ | A47K 11/026 |
| 2009/0077729 A1 * | 3/2009 | McLeod | ................ | A47K 11/02 |
| | | | | 4/300 |
| 2014/0157506 A1 * | 6/2014 | Morris | ................ | A47K 17/003 |
| | | | | 4/483 |
| 2015/0182405 A1 * | 7/2015 | Gradov | ................ | A61G 9/003 |
| | | | | 4/452 |
| 2015/0366420 A1 * | 12/2015 | Theisen | ................ | A47K 17/02 |
| | | | | 4/300 |
| 2016/0270608 A1 * | 9/2016 | Morris | ................ | A47K 13/30 |
| 2016/0324377 A1 * | 11/2016 | Morris | ................ | A47K 11/026 |
| 2020/0367705 A1 * | 11/2020 | Nelson | ................ | A47K 11/026 |
| 2021/0052116 A1 * | 2/2021 | Chuang | ................ | A47K 11/026 |
| 2021/0085134 A1 * | 3/2021 | Welfare | ................ | A47K 13/307 |
| 2023/0363595 A1 * | 11/2023 | Bayne | ................ | A47K 11/026 |

FOREIGN PATENT DOCUMENTS

| | | | | | |
|---|---|---|---|---|---|
| CN | 113491469 A | * | 10/2021 | ........... | B31B 70/645 |
| CN | 118387411 A | * | 7/2024 | ........... | A47K 11/026 |
| DE | 102020110107 A1 | * | 10/2020 | ......... | B29C 66/8122 |
| DE | 102020113305 A1 | * | 11/2020 | ........... | A47K 11/026 |
| EP | 2547245 B1 | * | 4/2017 | ............. | A47K 11/026 |
| EP | 4520232 A1 | * | 3/2025 | ............. | A47K 13/24 |
| GB | 2288194 A | * | 10/1995 | ........... | A47K 11/026 |
| KR | 101650682 B1 | * | 8/2016 | ............. | A47K 11/10 |
| TW | 108120971 | | 6/2019 | | |
| TW | I706761 B | * | 10/2020 | ............. | A61G 9/003 |
| TW | I871152 B | * | 1/2025 | ............. | A61G 9/003 |
| WO | WO-2004062451 A1 | * | 7/2004 | ............. | B09B 3/00 |
| WO | WO-2015103449 A1 | * | 7/2015 | ............. | A61G 9/003 |
| WO | WO-2016149782 A1 | * | 9/2016 | ............. | E03D 11/00 |
| WO | WO-2018031034 A1 | * | 2/2018 | ............. | A61G 9/003 |
| WO | WO-2021053398 A2 | * | 3/2021 | ............. | A47K 3/307 |

* cited by examiner

WATERLESS TOILET

FIELD OF THE INVENTION

The present invention relates to a waterless toilet, particularly to a waterless toilet having two plastic sheets, which catch excrement completely.

BACKGROUND OF THE INVENTION

Toilets today can not only collect human waste and prevent small of human waste with water but also facilitate cleaning, thus being very convenient. However, this kind of toilet requires a large amount of water. When used in public transportation, such as airplanes, transportation of required water causes great expenses.

To solve the problems mentioned above, the inventor disclosed a waterless toilet with a waterless sewage device and its structure, in patent applications Taiwan-Patent No. 108120971, China-Patent No. 201910567841.3, and U.S. patent Ser. No. 16/549,797, wherein plastic bags are mainly used to initially collected human waste and prevent from dispersing smell of human waste. However, plastic bags are not easy to install and need to be replaced frequently.

Regarding above points, the conventional method implies the above-mentioned problems. It is urgent to solve these problems. Therefore, the inventor began to think about the improvement of methods and devices.

SUMMARY OF THE INVENTION

The main object of the present invention is to provide a waterless toilet, wherein excrement is captured without using water and smell of collected human waste is prevented, furthermore, consumables costs of plastic cloth are saved.

For achieving above mentioned objects, the present invention comprises: a base having a frame on the top, wherein the frame is a rectangular structure consisting of a front rod, a back rod, a left rod and a right rod building up a penetration opening in the middle; a first roller pivoted between the front rod and the back rod, wherein the first roller has at least one recess; a second roller pivoted parallel to the first roller between the front rod and the back rod; when the recess of the first roller turns away the frame or the second roller, the frame opening is airtightly sealed by both the first roller and the second roller together; two support brackets set on the top of the frame; two support plates, wherein the first sides of the two support plates are set above the two support brackets, while the second sides of the two support plates oppositely extend inward and downward for a predetermined length and between the second sides of the two support plates there is a gap; two cloth rolls, set at both sides of the frame, holding a plastic sheet respectively, wherein the plastic sheets of the two cloth rolls are laid on the two support plates and pass through the gap between the two support plates, then pass through between the first roller and the second roller; a driver, to drive rotating the first roller and the second roller, then relatedly drive the plastic sheets of the two cloth rolls moving downward; a seat cushion bracket set on the base; a toilet seat set on the seat cushion bracket, wherein the toilet seat has a excretion opening in the middle.

Preferably, at the side of the recess of the first roller is provided at least one radial cushion set in the radial direction all around the surface of the first roller, to drive the plastic sheets surely moving downward.

Preferably, the second roller, correspondingly to the radial cushion of the first roller, has a radial cushion to drive the plastic sheets moving downward.

Preferably, at the side of the recess of the first roller is provided at least one radial cushion along the central axis of the first roller, thereby smell of human waste in the storage tank is reliably prevented.

Preferably, the second roller has a radial cushion, correspondingly to the radial cushion of the first roller, thereby smell of human waste is reliably prevented.

Preferably, the second roller has a recess, correspondingly to the recess of the first roller, for collecting human waste.

Other aspects and advantages of the present invention will become apparent from the following detailed description, taken in conjunction with the accompanying drawings, illustrating by way of example the principles of the present invention.

DESCRIPTION OF THE PREFERRED EMBODIMENTS

Each embodiment of the present invention will be described based on the drawings below. To make features easier to understand, features may be enlarged or exaggerated in the drawings, and the dimensional proportions of constituent elements may deviate from reality.

FIGS. 1-9 refer to the first embodiment of the present invention. As shown in FIGS. 1-9, a waterless toilet of the present invention comprises: a base 1, having a frame 2 on the top, wherein the frame is a rectangular structure consisting of a front rod 21, a back rod 22, a left rod 23 and a right rod 24 building up an penetration opening 25 in the middle; a first roller 3 pivoted between the front rod 21 and the back rod 22, wherein the first roller 3 has at least one recess 31; a second roller 4 pivoted parallel to the first roller 3 between the front rod 21 and the back rod 22, when the recess 31 of the first roller 3 turns away the frame 2 or the second roller 4, the penetration opening 25 of the frame 2 is airtightly sealed by both the first roller 3 and the second roller 4 together; two support brackets 5 set on the top of the frame 2; two support plates 6, wherein the first sides 61 of the two support plates 6 are set above the two support brackets 5, wherein the second sides 62 of the two support plates 6 oppositely extend inwardly and downwardly for a predetermined length and between the second sides 62 of the two support plates 6 there is a gap 63; two cloth rolls 7 set at both sides of the frame 1, holding a plastic sheet 71 respectively, wherein the plastic sheets 71 of the two cloth rolls 7 are laid on the two support plates 6 and pass through the gap 63 between the two support plates 6, then pass through between the first roller 3 and the second roller 4; a driver 8, to drive rotating the first roller 3 and the second roller 4 and relatedly drive the plastic sheets 71 of the two cloth rolls 7 to move downward; a seat cushion bracket 9 set on the base 1; a toilet seat 91 set on the seat cushion bracket 9, wherein the toilet seat has a excretion opening 911 in the middle; thereby, excrement is captured without using water and small of collected human waste is prevented, furthermore consumables costs of plastic cloth are saved. This will be explained in detail below.

Figure 1:
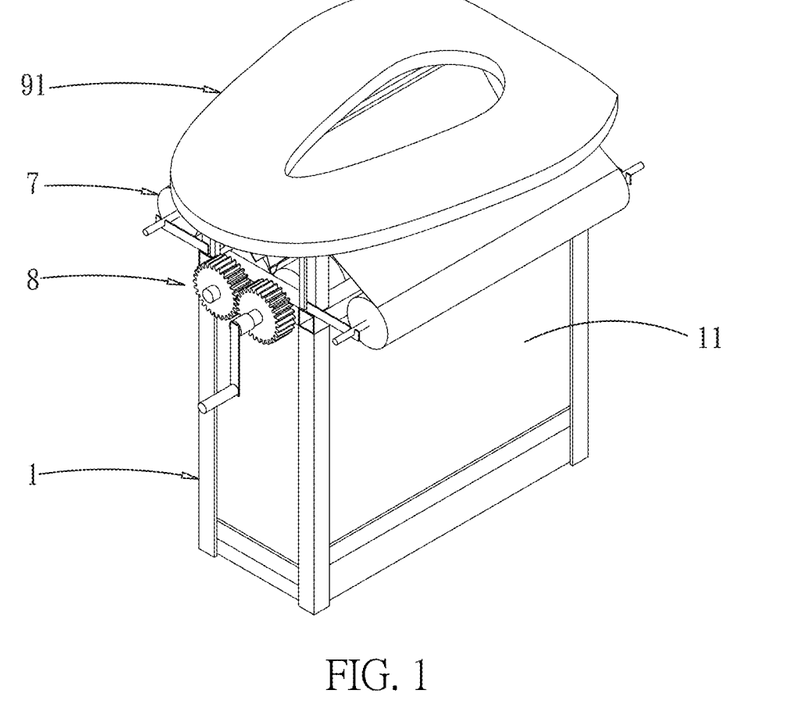
FIG. 1 is a perspective view of the first embodiment of the present invention.
Figure 2:
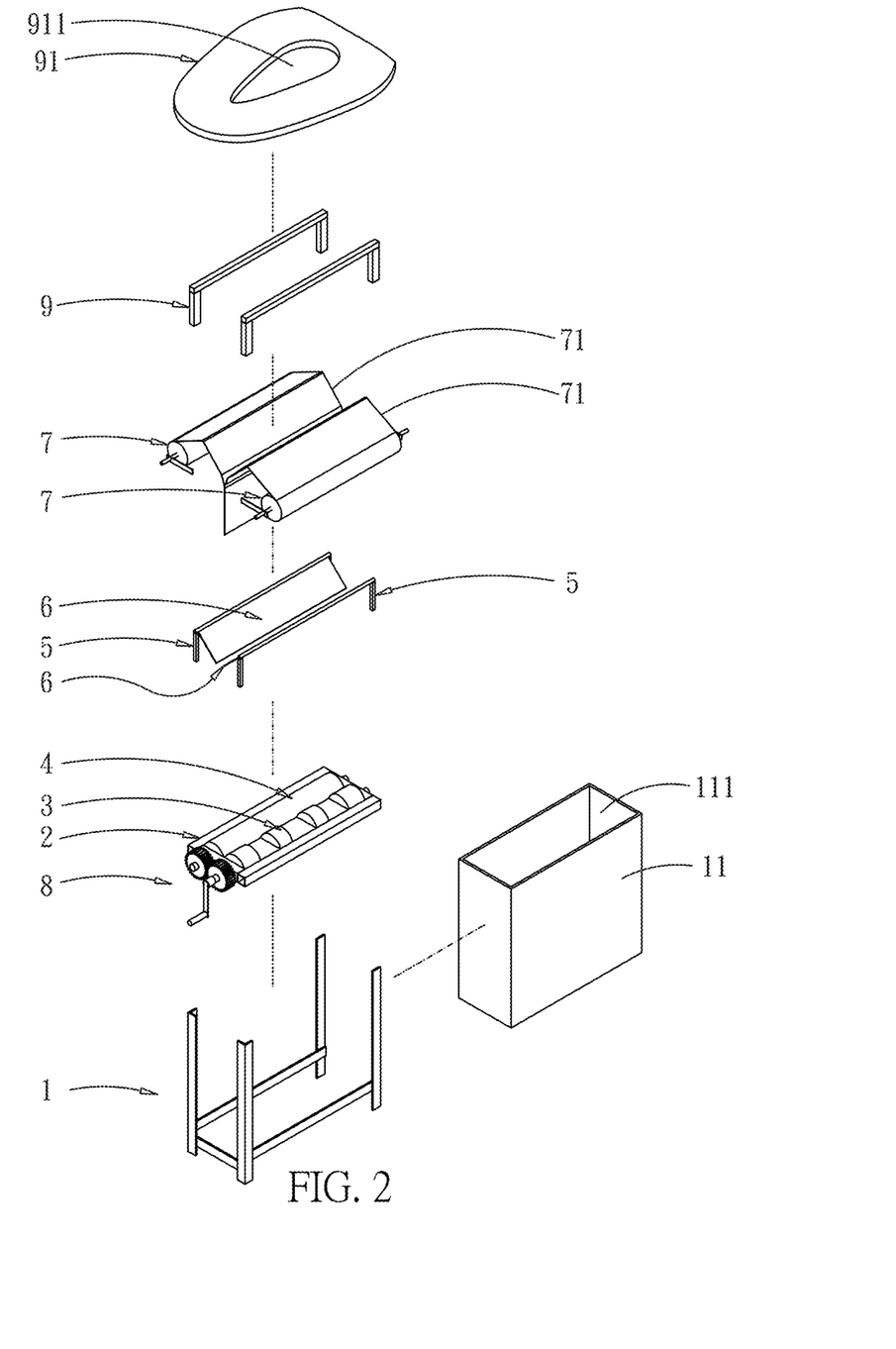
FIG. 2 is an exploded view of the first embodiment of the present invention.
Figure 3:
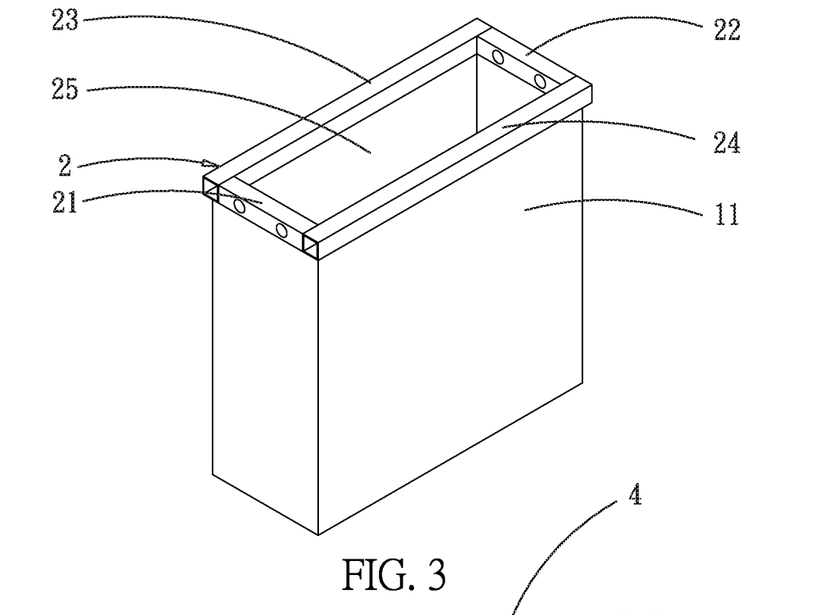
FIG. 3 is a schematic view of the frame and the storage tank of the present invention.

As shown in FIGS. 2 and 3, a base 1 having a frame 2 on the top. The frame 2 is a rectangular structure consisting of a front rod 21, a back rod 22, a left rod 23, and a right rod 24 which build up a penetration opening 25 in the middle. The base 1 is used mainly for supporting the frame 2 and other components, besides, at the position of the base 1 under the penetration opening 25 of the frame 2 there is a detachable storage tank 11, on the top of the storage tank 11 there is an opening 111 connecting the penetration opening 25 of the frame 2 to collect human waste for subsequent processing.

Figure 4:
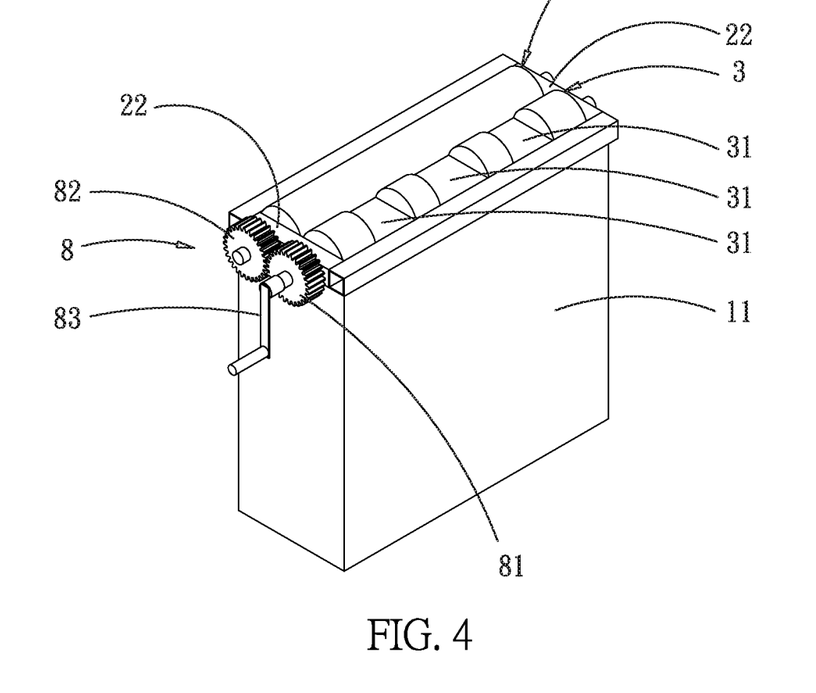
FIG. 4 is a schematic view of airtight closing the penetration opening of the frame with both the first roller and the second roller in the first embodiment of the present invention.

As shown in FIG. 4, the first roller 3 and the second roller 4 are in parallel orientations pivoted between the front rod 21 and the back rod 22. The first roller 3 has at least one recess 31.

When the recess 31 of the first roller 3 turns away the frame 2 or the second roller 4, the penetration opening 25 of the frame 2 is airtightly sealed by both the first roller 3 and the second roller 4 together, to prevent small of human waste in the storage tank 11.

In the first embodiment, it is consisted mainly of the first roller 3 and the second roller 4 leaning inside the frame 2, wherein the first roller 3 and the second roller 4 are leaning close together and interrupted through the plastic sheets 71, thereby it is achieved that the penetration opening 25 of the frame 2 is airtightly sealed by both the first roller 3 and the second roller 4 together. Between the first roller 3 and the second roller 4 and the frame 2 there can also be a cushion or another airtight structure (not shown).

Around the opening 111 of the storage tank 11 can also be airtightly sealed with the frame 2 and furthermore, smell of human waste in the storage tank 11 is prevented. In particular, as shown in FIG. 3, smell of human waste in the storage tank 11 can only disperse through the opening 111 passing the penetration opening 25 of the frame 2, thus, as shown in FIG. 4, when the frame 2 is airtightly sealed by both the first roller 3 and the second roller 4 together, it can reliably prevent small of human waste in the storage tank 11.

Figure 6:
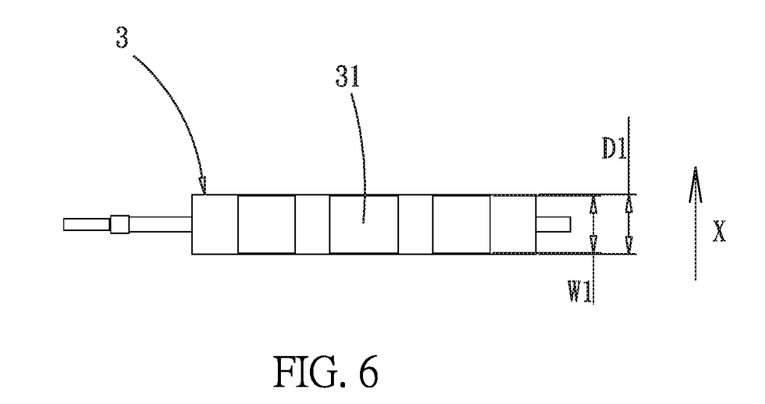
FIG. 6 is a top view of the first roller in the first embodiment of the present invention.
Figure 7:
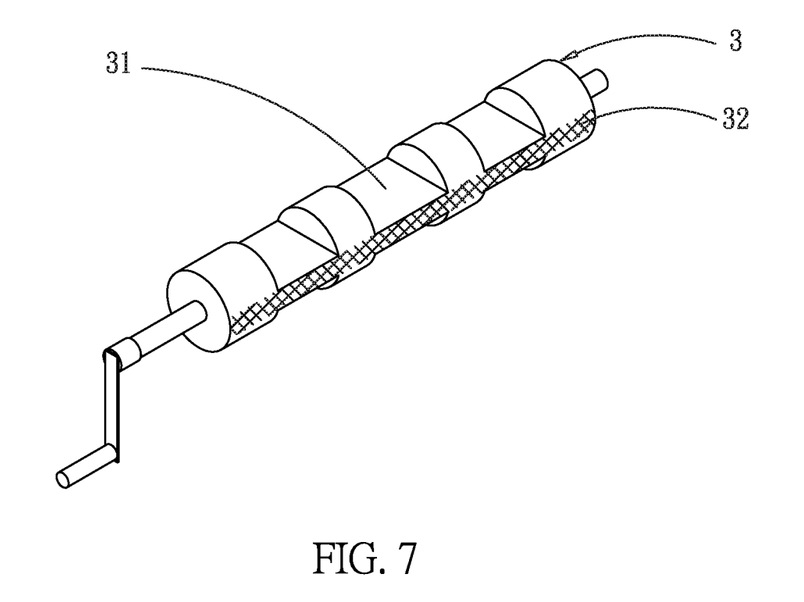
FIG. 7 is a perspective view of the first roller in the first embodiment of the present invention.
Figure 8:
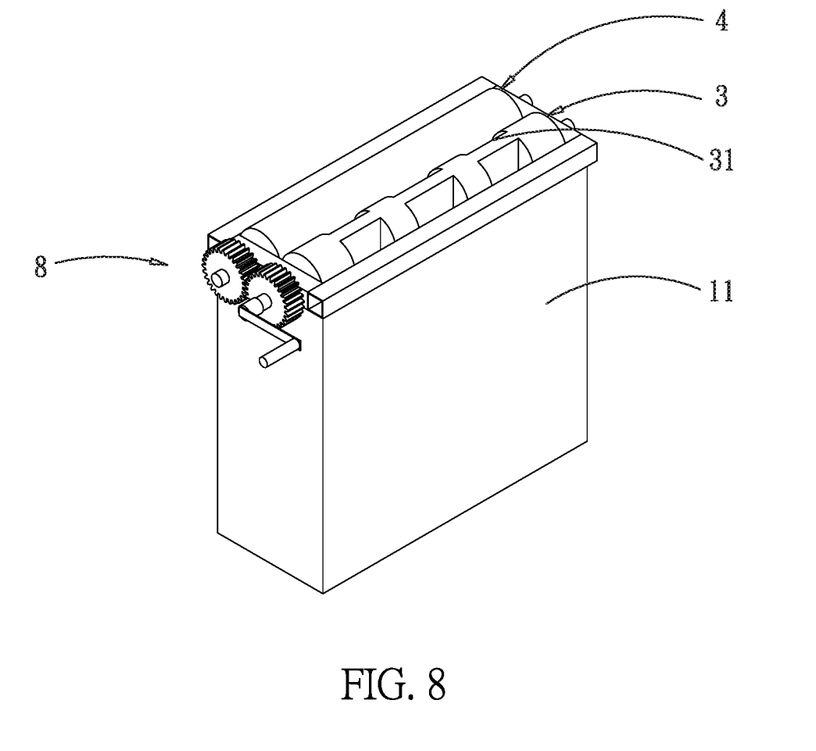
FIG. 8 is a schematic view of rolling the first roller in the first embodiment of the present invention.

As shown in FIGS. 6-8, for plain explanation, here assumed the diameter direction X as the width direction of the recess 31 of the first roller 3. The width W1 of the recess 31 of the first roller 3 is less than the diameter D1 of the first roller, so that the first roller 3 has at least two sealing sides 32 (in the FIG. 7, the position of the sealing side 32 is shown as a grid). The two sealing sides 32 are the widest part of the first roller 3, together with the second roller 4, by which the penetration opening 25 of the frame 2 is airtightly sealed. Contrarily, when the first roller 3 is rotated so that the recess 31 of the first roller 3 faces to the second roller 4, human waste can pass through the penetration opening 25 of the frame 2. When the recess 31 of the first roller 3 turns away the frame 2 or the second roller 4, the two sealing sides 32 of the first roller 3 lean against the second roller 4 and the frame 2 respectively, so that the penetration opening 25 of the frame 2 is airtightly sealed by both the first roller 3 and the second roller 4 together, thereby small of human waste in the storage tank 11 is prevented.

Figure 5:
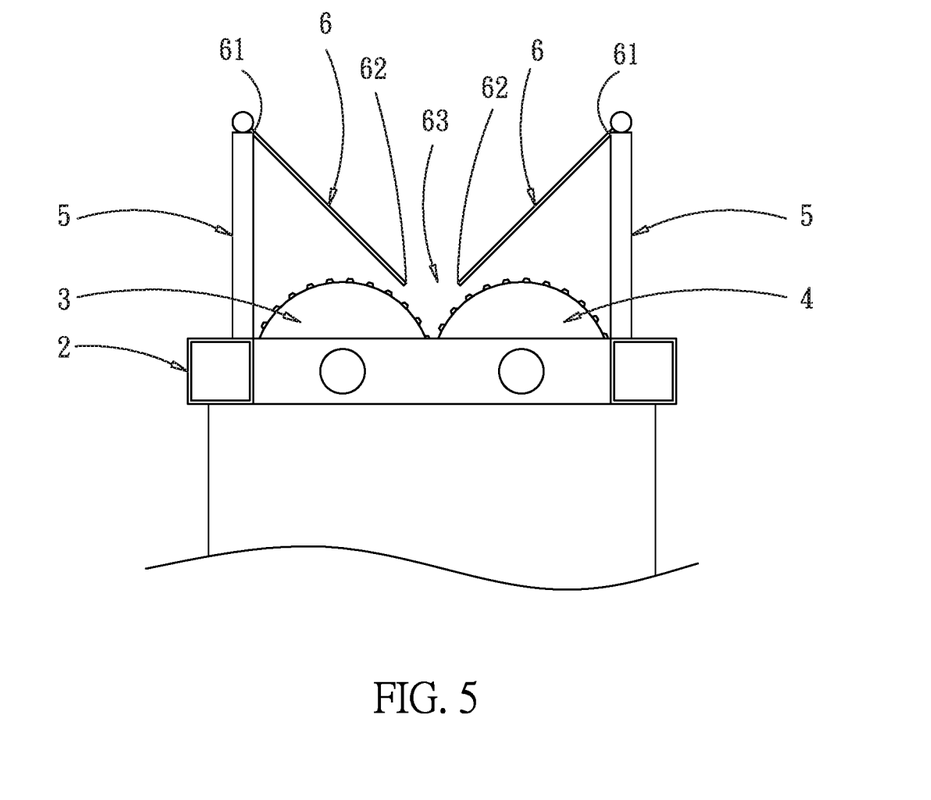
FIG. 5 is a schematic view of the two support plates in the first embodiment of the present invention.

As shown in FIG. 5, the gap 63 between the two support plates 6 is positioned corresponding to the upper part between the first roller 3 and the second roller 4, thereby it is convenient to collect human waste.

Figure 9:
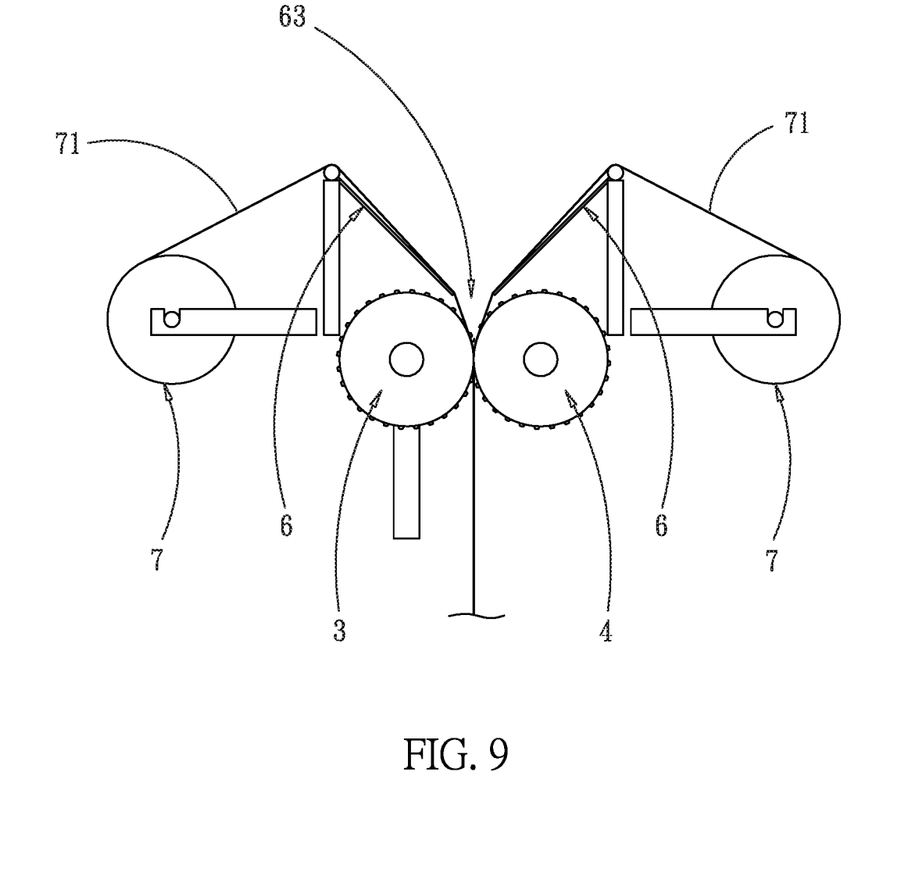
FIG. 9 is a schematic view of the two cloth rolls in the first embodiment of the present invention.

As shown in FIG. 9, the plastic sheets 71 of the cloth rolls 7 are laid on the two support plates 6 respectively, then pass through the gap 63 between the two support plates 6, and further pass through between the first roller 3 and the second roller 4. As shown in FIG. 8 there is no human waste yet, now the plastic sheets 71 are clamped by the first roller 3 and the second roller 4, so they are in a tightened state. When human waste has fallen on the plastic sheets 71, the cloth rolls 7 will be driven to rotate and more plastic sheets 71 will be stretched out, so that the plastic sheets 71 and human waste are collected in the recess 31 of the first roller 3.

The plastic sheets 71 of the two cloth rolls 7 are shaped as sheets, as compared with conventional long strip bags, hence being easy to produce, saving costs. Besides, since the plastic sheet is easy to produce, it can be used even in a longer shape, which can increase the endurance of the cloth roll 7 and reduce the frequency of replacements of consumables such as the cloth sheets 7. The plastic sheet 71 can be made of biodegradable materials to facilitate subsequent processing.

In each drawing, the dimensions of components such as the first roller 3, the second roller 4, and the storage tank 11 are shown for illustrative purposes. In practice, the size of the recess 31 of the first roller 3 will be larger than the amount of human waste generated once, and the capacity of the storage tank 11 may accommodate the entire cloth rolls 7 with the plastic sheets until it is used up.

The driver 8 can be a device powered by manual or pedal power, or an electric mechanism, such as a motor. In this embodiment, a structure with a manual rocker is taken as an example. Therein, the driver 8 furthermore comprises: a first gear 81, linked with the first roller 3; a second gear 82, linked with the second roller 4 and meshed with the first gear 81; a rocker 83, linked with the first gear 81, wherein the first roller 3 is rotated to drive the second roller 4, and by both the first roller 3 and the second roller 4 the plastic sheets 71 of the two cloth rolls 7 are clamped and driven to move downward.

The seat cushion bracket 9 is used to support the toilet seat 91. In this case, the vertical upward area of the two support plates 6 is larger than the excretion opening 911 of the toilet seat 91, so that the plastic sheets 71 laid on the support plates 6 can completely capture human waste falling from the excretion opening 911 of the toilet seat 91. Besides, the height of the seat cushion bracket 9 is slightly higher than the second support bracket 5, which means, without affecting the rotation of the cloth rolls 7, keeping the bottom of the toilet seat 91 possibly close to the first sides 61 of the support plates 6, to use the plastic sheets 71 on the support plates 6 to completely capture human waste falling from the excretion opening 911 of the toilet seat 91.

As shown in FIG. 4, when the penetration opening 25 of the frame 2 is airtightly sealed by both the first roller 3 and the second roller 4 together, smell of human waste in the storage tank 11 is prevented. As shown in FIG. 2 and FIG. 9, when human waste has fallen from the excretion opening 911 of the toilet seat 91, since the vertical upward area of the two support plates 6 is larger than the excretion opening 911 of the toilet seat 91, even if human waste splashes downward and outward, it will be captured by the plastic sheets 71 on the support plates and will fall through the gap 63 between the two support plates 6 to the recess 31 of the first roller 3. As shown in FIG. 8, when human waste needs to be collected, the first roller 3 and the second roller 4 are rotated by the driver 8 for more than half a turn, until all human waste has fallen into the storage tank 11 completely, and then both the first roller 3 and the second roller 4 are returned to that, as shown in FIG. 4, the penetration opening 25 of the frame 2 is airtightly sealed. Thereby, human waste can be collected without using water, and the costs of consumables such as plastic sheets can be saved.

Figure 10:
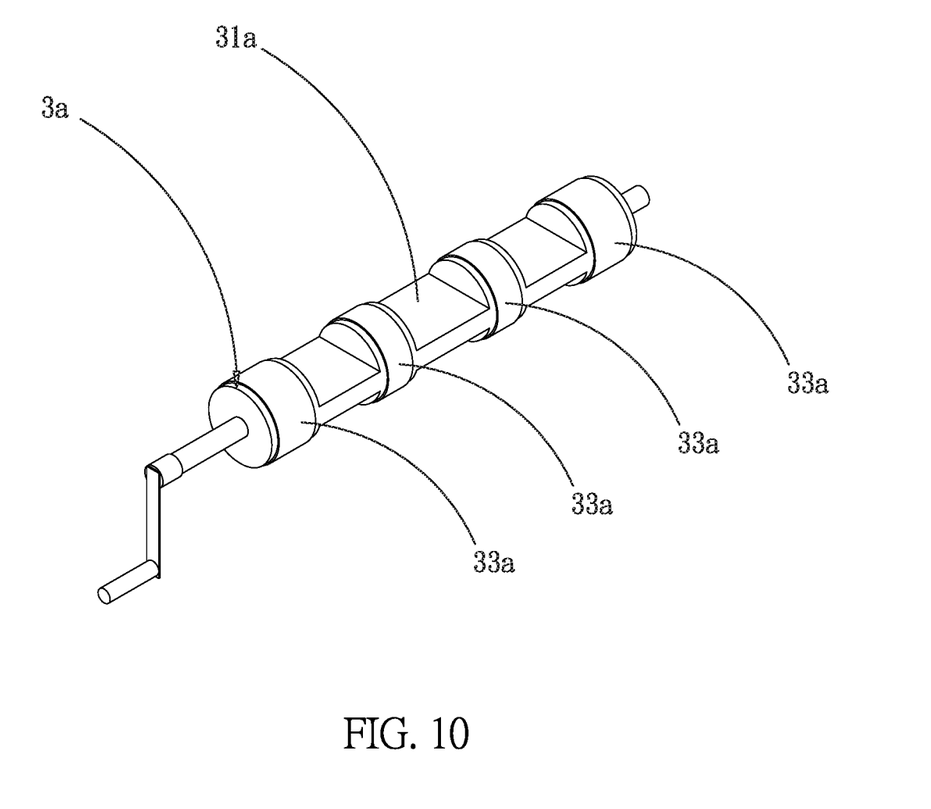
FIG. 10 is a perspective view of the first roller in the second embodiment of the present invention.

FIG. 10 refers to the second embodiment of the present invention. As shown in FIG. 10, next to the recess 31a of the first roller 3a there is at least one radial cushion 33a. The radial cushion 33a is arranged around the surface of the first roller 3a along the diameter direction of the first roller 3a. The radial cushion 33a can cooperate with the first roller and the second roller to clamp the plastic sheets with a predetermined pressure, so that when the first roller and the second roller are rotated, the plastic sheets can be reliably driven to move downward.

Figure 11:
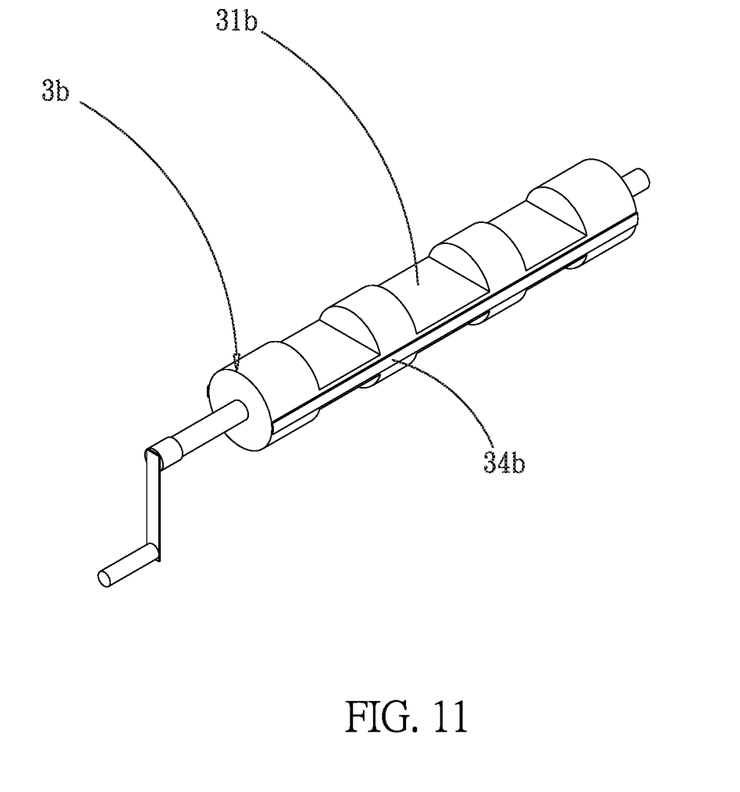
FIG. 11 is a perspective view of the first roller in the third embodiment of the present invention.

FIG. 11 refers to the third embodiment of the present invention. As shown in FIG. 11, next to the recess 31b of the first roller 3b there is at least one axial cushion 34b, arranged on the surface of the first roller 3b along the central axis of the first roller 3b. The axial cushion 34b is filled between the first roller and the second roller, when the penetration opening of the frame is airtightly sealed both the first roller and the second roller together, thereby smell of human waste in the storage tank is reliably prevented.

For achieving an effect of airtight sealing, the axial cushion 34b is used together with the said radial cushion 33a.

Figure 12:
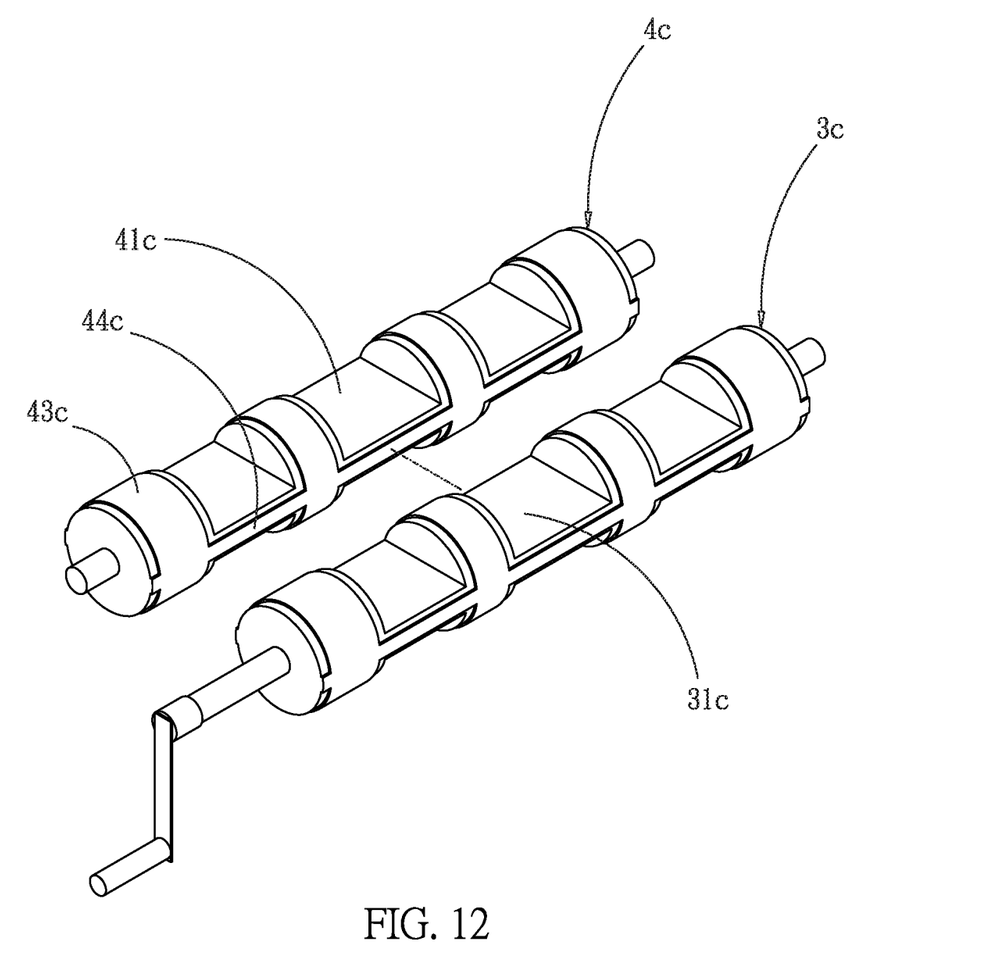
FIG. 12 is a schematic view of the second roller having recesses in the fourth embodiment of the present invention.

FIG. 12 refers to the fourth embodiment of the present invention. As shown in FIG. 12, the second roller 4c has a recess 41c corresponding to the recess 31c of the first roller 3c to collect human waste. In addition, the second roller 4c may also be set with a radial cushion 43c and/or an axial cushion 44c corresponding to the first roller 3c.

The invention claimed is:

1. A waterless toilet, comprises:

A base, having a frame on the top, wherein the frame is a rectangular structure consisting of a front rod, a back rod, a left rod, and a right rod building up a penetration opening in the middle;

a first roller, pivoted between the front rod, and the back rod; wherein the first roller has at least one recess;

a second roller, pivoted parallel to the first roller between the front rod and the back rod, when the recess of the first roller turns away the frame or the second roller, the penetration opening of the frame is airtightly sealed by both the first roller and the second roller;

two support brackets set on the top of the frame;

two support plates, wherein the first sides of the two support plates are set above the two support brackets, wherein the second sides of the two support plates oppositely extend inwardly and downwardly for a predetermined length and between the second side of the two support plates there is a gap;

two cloth rolls set at both sides of the frame; wherein the two cloth rolls hold a plastic cloth respectively, wherein a plastic sheets of the two cloth rolls are laid on the two support plates and pass through the gap between the two support plates, then pass through between the first roller and the second roller;

a driver, to rotate the first roller and the second roller and drive the plastic sheets of the two cloth rolls to move downward;

a seat cushion bracket set on the base;

a toilet seat set on a seat cushion bracket; wherein the toilet seat has an excretion opening in the middle.

2. The waterless toilet of claim 1, wherein next to the recess of the first roller is provided at least one radial cushion, arranged around the surface of the first roller along the diameter direction of the first roller.

3. The waterless toilet of claim 2, wherein the second roller has a radial cushion corresponding to the radial cushion of the first roller.

4. The waterless toilet of claim 1, wherein next to the recess of the first roller is provided at least one axial cushion, arranged on the surface of the first roller along the central axis of the first roller.

5. The waterless toilet of claim 4, wherein the second roller has an axial cushion corresponding to the axial cushion of the first roller.

6. The waterless toilet of claim 1, wherein the second roller has a recess corresponding to the recess of the first roller.

* * * * *